United States Patent [19]
Aiyama et al.

[11] Patent Number: 5,675,896
[45] Date of Patent: Oct. 14, 1997

[54] PORTABLE ELECTRIC WORKING MACHINE

[75] Inventors: Fumihiko Aiyama, Musashimurayama; Tatsuhiko Matsubayashi, Kamakura; Naoki Tsuda, Tokyo, all of Japan

[73] Assignee: Kioritz Corporation, Tokyo, Japan

[21] Appl. No.: 547,533

[22] Filed: Oct. 24, 1995

[30] Foreign Application Priority Data

Oct. 31, 1994 [JP] Japan .................................. 6-267219

[51] Int. Cl.$^6$ ................................................ A01G 3/06
[52] U.S. Cl. .................... 30/216; 30/228; 30/DIG. 1; 318/139; 320/2; 361/58; 361/29
[58] Field of Search .................. 30/228, 388–394, 30/DIG. 1, 216; 318/139, 440, 501, 3; 320/2; 361/58, 23, 29, 33

[56] References Cited

U.S. PATENT DOCUMENTS

3,959,879  6/1976  Sellers .
4,091,434  5/1978  Suzuki et al. ..................... 361/58 X

Primary Examiner—Douglas D. Watts
Attorney, Agent, or Firm—Armstrong, Westerman, Hattori, McLeland & Naughton

[57] ABSTRACT

A portable electric working machine of the present invention includes a motor case portion housing an electric motor, a working portion driven by the electric motor, a handle connected to the motor case portion or the working portion and a power source switch disposed within a grip portion of the handle. Electric power is supplied to the electric motor through the power source switch. A spark-preventing capacitor accommodated within the motor case portion is interposed between a pair of terminals of the electric motor. The portable electric working machine of the present invention does not require a large-sized grip portion of a handle, and can prevent a locking of contacts of a power source switch due to contact transition by preventing sparking between the contacts so that a small-sized microswitch can be used.

7 Claims, 8 Drawing Sheets

PORTABLE ELECTRIC WORKING MACHINE

BACKGROUND OF THE INVENTION

1. Field of the Invention

The present invention relates to a portable electric working machine adapted for a trimmer, an edger, or the like, wherein an electric motor is used for a driver.

2. Description of the Related Art

Generally, a portable electric working machine comprises a motor case portion with a built-in electric motor, a working portion having a saw blade, such as a clipper blade, a rotary blade or a saw chain, or the like, driven by the electric motor, and a handle connected to the motor case portion or the working portion, wherein electric power is supplied to the electric motor through a power source switch, disposed within a grip portion of the handle, which can be switched from an ON condition to an OFF condition, or vice-versa by means of an operation member, such as, for example a starting lever, mounted on the grip portion of the handle.

In such a portable electric working machine, the grip portion of the handle should be of a size and shape fitted for an operator's hands in order to be easily manipulated and operated. In other words, the size and shape are determined such that the operators can easily grip and manipulate the operation member, such as a starting lever, so that there is little space within the grip portion. Thus, it is preferable that the small-sized power source switch be contained within the grip portion of the handle. However, if a microswitch is used as the small-sized power source switch (e.g., appropriately 30 mm length×20 mm width×10 mm height), the following problems are raised.

Figure 8:
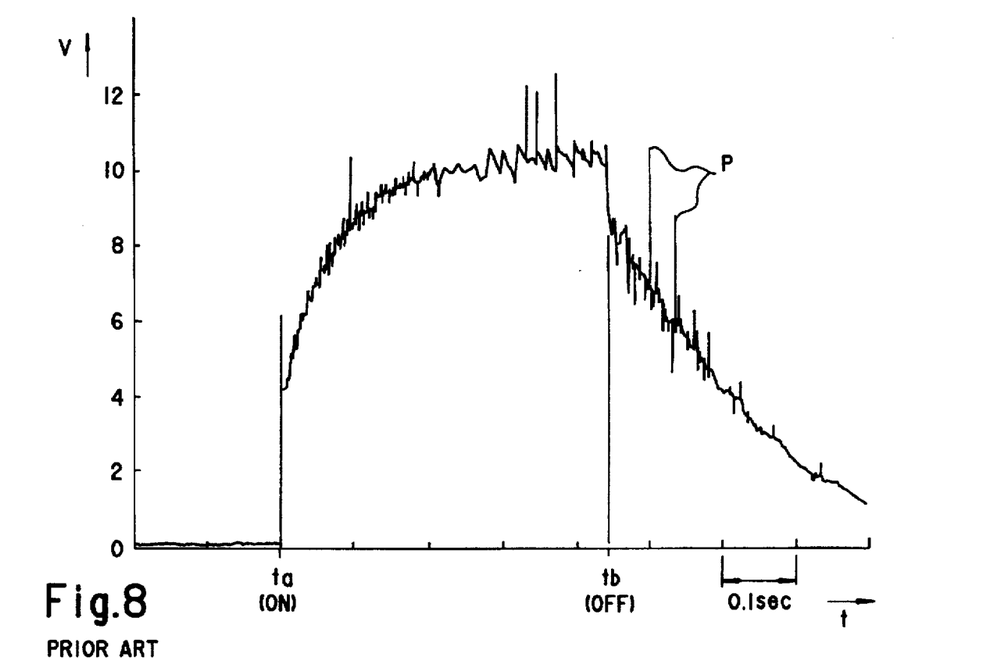
FIG. 8 is a graph showing an examination result of a conventional portable electric working machine.
Figure 9:
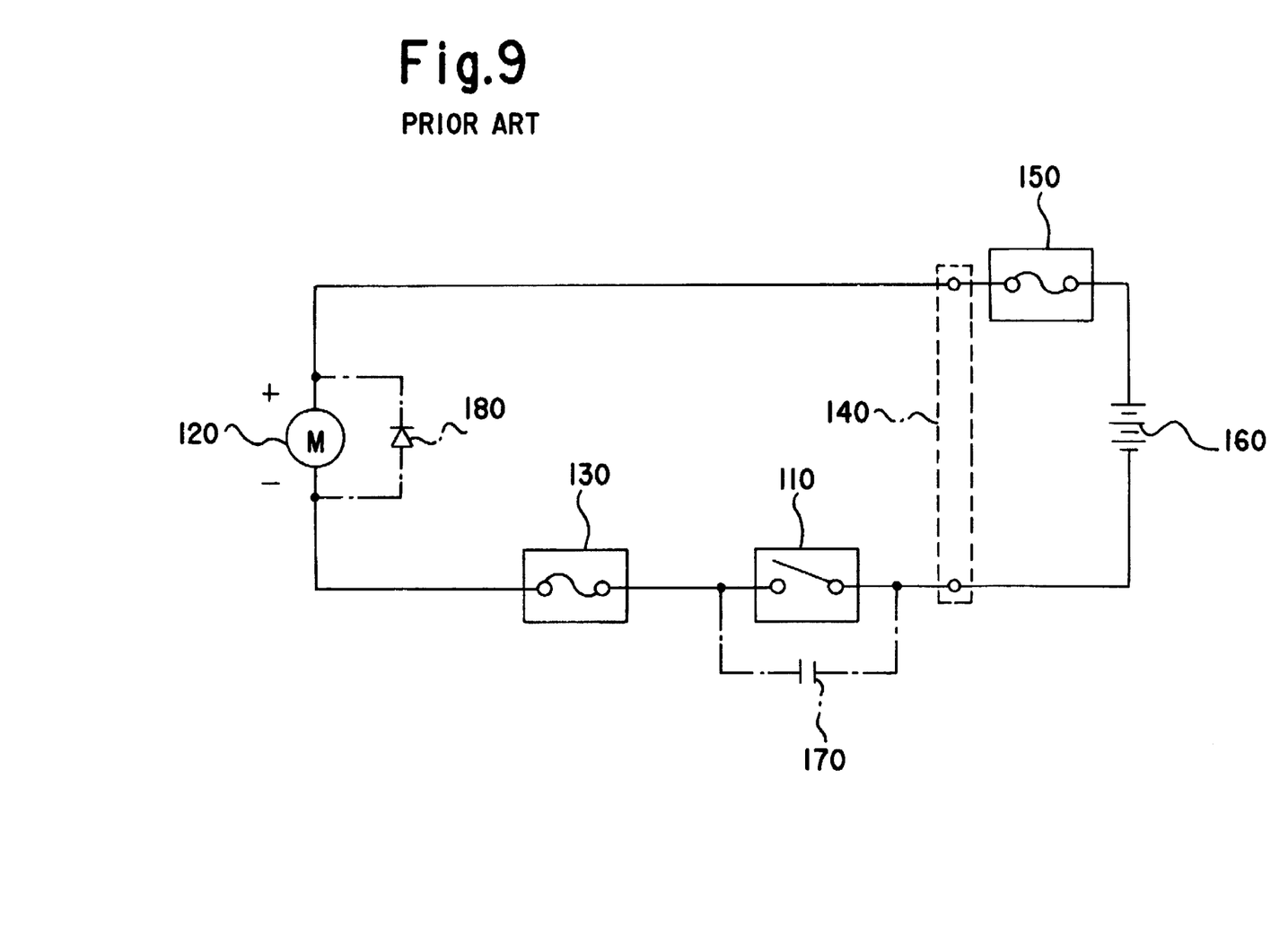
FIG. 9 is an equivalent circuit diagram of a conventional power source supply system.

As shown by solid lines in FIG. 9, for example, according to the conventional power supply system adapted for the foregoing portable electric working machine, a direct current or DC, 12 volt (V) power source 160 is connected to a pair of terminals of the power source connector 140 mounted within a motor case portion or the like, or those of a DC motor 120, through a power source switch 110 made of a microswitch as described above, a circuit protector 130 and a fuse 150. As shown in FIG. 8, in the foregoing circuit, when the power source switch 110 is turned on at a time ta and then turned off at a time tb, a rapid pulse-shaped voltage fluctuation occurs, as shown by the letter P, immediately after the OFF condition, and sparking is generated between the contacts of the power source switch 110, thereby causing a locking (e.g., seizing, burning, or the like) due to contact transition.

One of the main factors which causes the foregoing problems is that electric current surging into the DC motor 120 is comparatively large. Accordingly, the foregoing problems may be solved by use of a large-sized switch as the power source switch, the large-sized switch being larger than the microswitch in contact area and contact gap. However, such a large-sized switch is not preferable because it is normally too large-sized to be accommodated within the grip portion unless the size and shape of the grip portion of the handle is changed, which, in turn, would degrade operativity and the like.

As shown by dashed lines in FIG. 9 illustrating a circuit diagram of the conventional power supply system, a diode 180 is interposed between the terminals of the DC motor 120, or a capacitor 170 (1 μF–250 μF) is interposed between the terminals of the power source switch 110. Because such a conventional power supply system aims mainly at removing noises, contact transition and locking caused by sparking cannot be prevented when the switch is turned off. As will be apparent from the foregoing, the grip portion of the handle, in which the power source switch is mounted, has little room for accommodating large-sized electric parts, such as a large-sized capacitor, a diode, and the like.

SUMMARY OF THE INVENTION

In view of the foregoing disadvantages, inherent in the known type of prior art, the present invention aims at solving the above-stated problems of a portable electric working machine, in which electric power is supplied to an electric motor through a power source switch disposed in a grip portion of a handle.

An object of the present invention is to provide a portable electric working machine which does not require a large-sized grip portion of a handle, and can avoid a locking of contacts of a power source switch due to contact transition by preventing sparking between the contacts so that a small-sized microswitch can be used.

To attain the foregoing, a portable electric working machine according to the present invention basically includes a motor case portion with a built-in electric motor, a working portion driven by the electric motor, a handle connected to the motor case portion or the working portion and a power source switch disposed within a grip portion of the handle, wherein electric power is supplied to the electric motor through the power source switch.

A spark-preventing capacitor accommodated within the motor case portion is interposed between a pair of terminals of the electric motor.

When a DC 12 V rechargeable battery is used as a power source, a capacitor having a capacitance of 330 μF or less which may be insufficient to get favorable results, but a capacitor having a capacitance of 450 μF or more will produce satisfactory results.

In the portable working machine according to the present invention, a spark-preventing capacitor interposed between a pair of terminals of the electric motor absorbs voltage fluctuations and therefore prevents sparking between the contacts of the power source switch when the power source switch is turned off. Thus, a small-sized microswitch used as a power source switch can be prevented from causing a locking of the contacts due to contact transition.

Since a spark-preventing capacitor is disposed in the relatively large-spaced motor case portion and a small-sized microswitch can be used as a power source switch, a large-sized grip portion of the handle is not required and therefore better manipulability and operativity results.

BRIEF DESCRIPTION OF THE DRAWINGS

The present invention will be more fully described and better understood from the following description, in view of the appended drawings, as follows.

DETAILED DESCRIPTION OF THE PREFERRED EMBODIMENT

A preferred embodiment of the present invention will now be described, in detail, with reference to the accompanying drawings.

Figure 1:
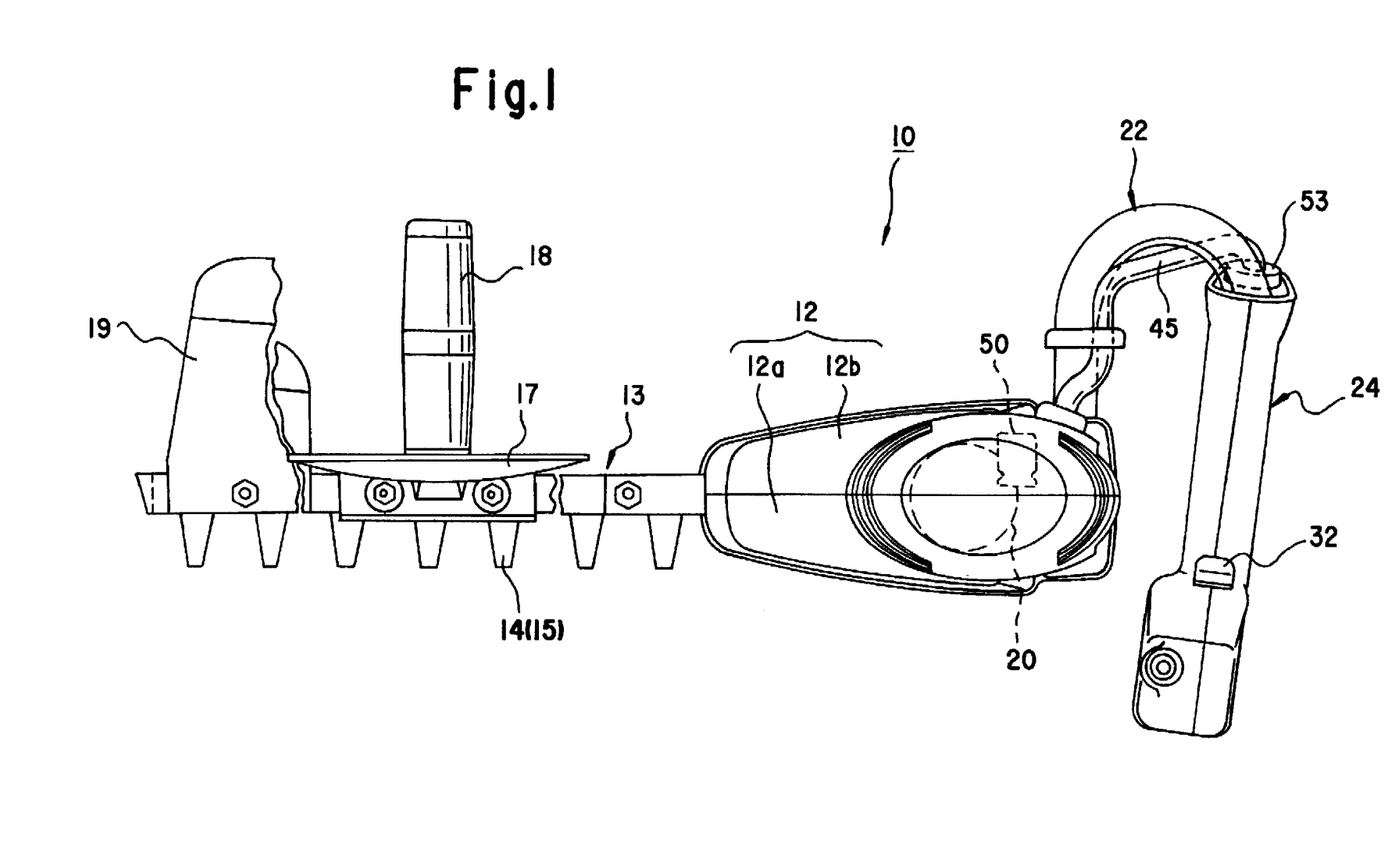
FIG. 1 is a plan view of a portable electric working machine according to the present invention, which is one of the clipper-type trimmers.
Figure 2:
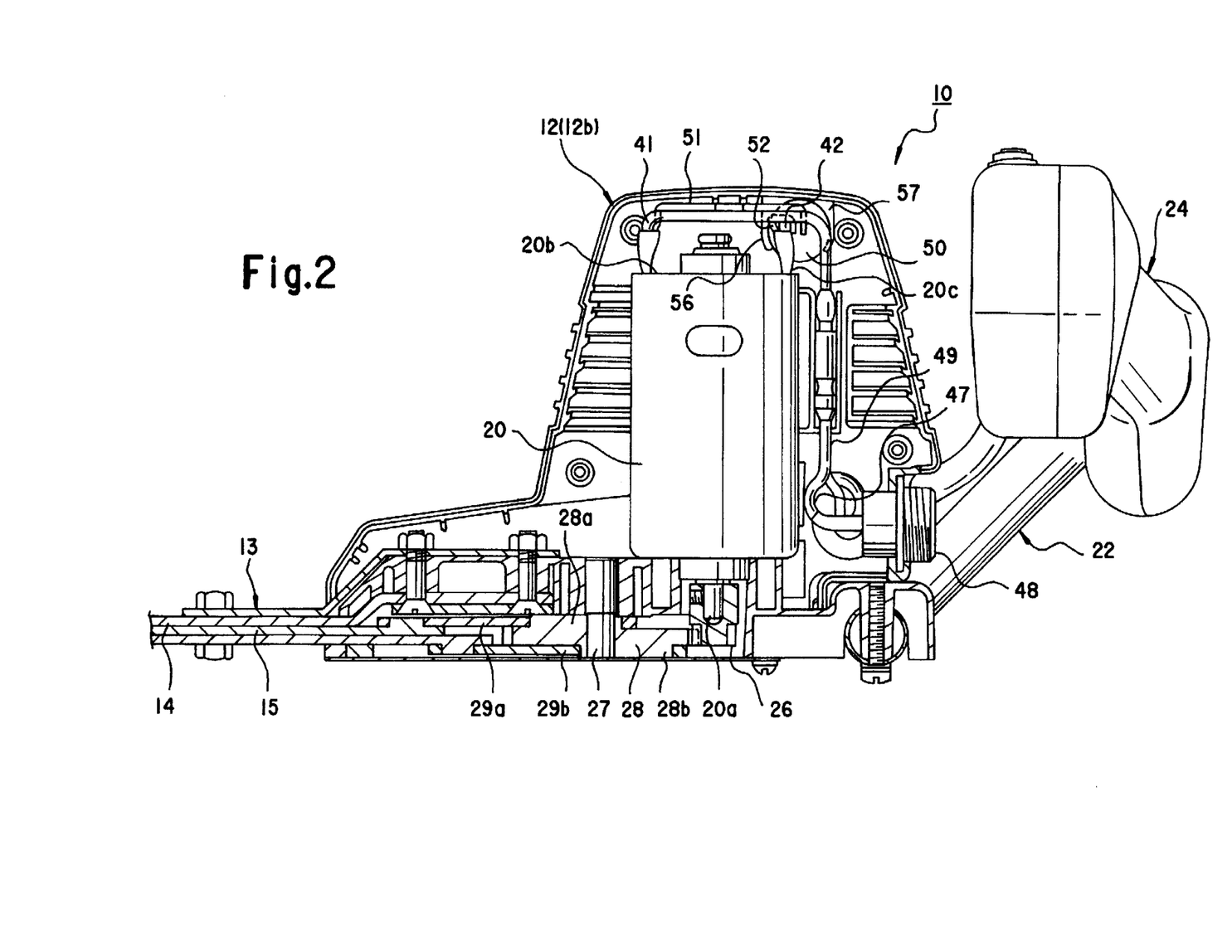
FIG. 2 is a cross-sectional view of a motor case portion shown in FIG. 1.
Figure 3:
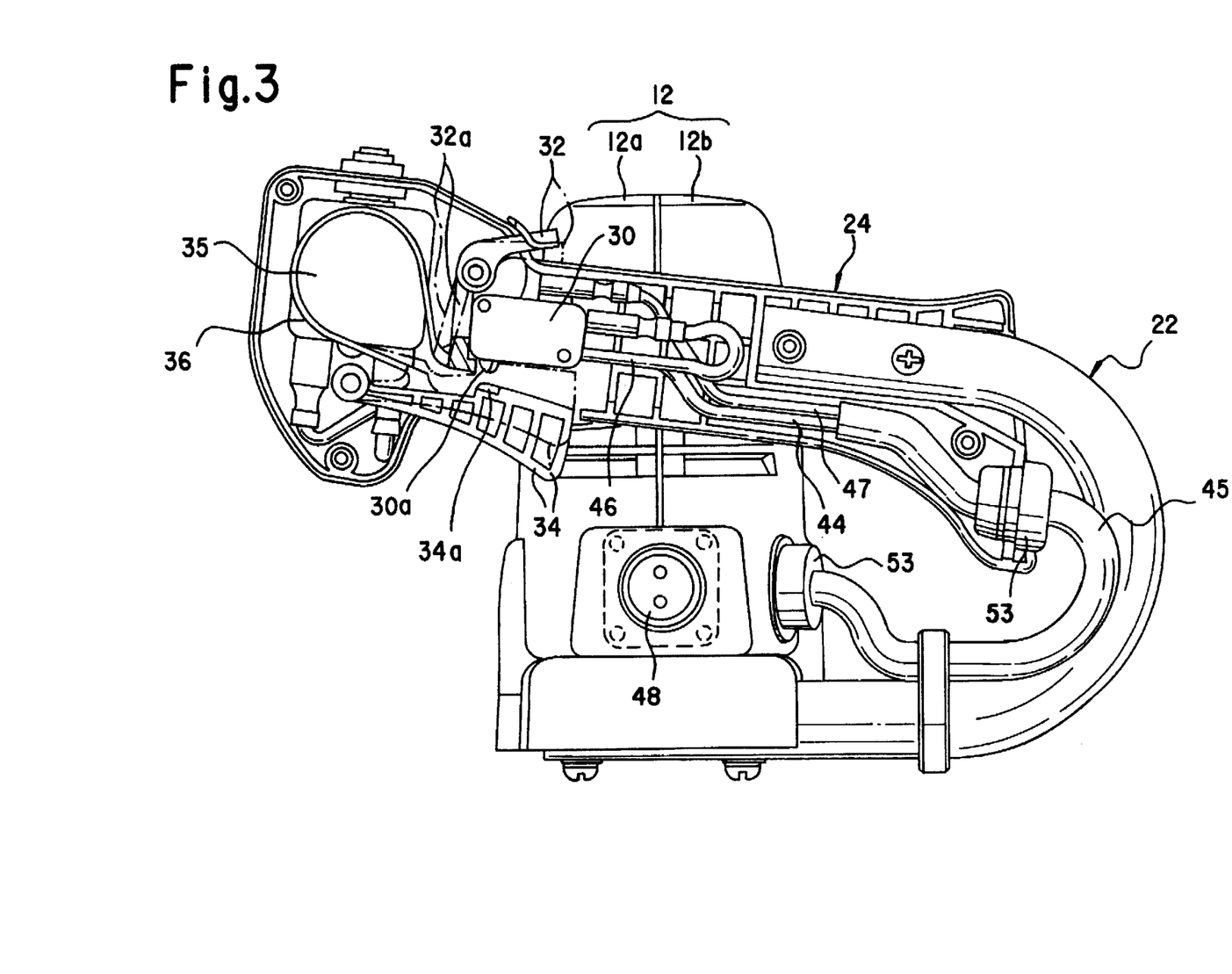
FIG. 3 is a cross-sectional view of a grip portion of a handle shown in FIG. 1.

FIGS. 1–3 show a whole plan view, a cross-sectional view of a motor case portion and a cross-sectional view of a grip portion, respectively, of a handle of a clipper-type trimmer 10 as one of the portable electric working machines according to the present invention.

The trimmer 10 in this embodiment includes a ski boot-shaped motor case portion 12 having a left half casing 12a and a right half casing 12b, in which a 12 V DC motor 20 is disposed. The trimmer 10 further includes a working portion 13 comprising a pair of upper and lower clipper blades 14, 15, a grass correction plate 19 and the like, operated by the above mentioned DC motor 20, a front handle 18 with a protector 17 fixed to the working portion 13 and a generally U-shaped rear handle 22 connected to the motor case portion 12 and a grip portion 24 connected to an upper end portion of the rear handle 22.

A leading edge portion of an output shaft 20a protrudes downwardly from the DC motor 20 and is provided with a pinion gear 26 as shown in FIG. 2. The pinion gear 26 is engaged with a cam gear 28 having, at its upper and lower surfaces, eccentric cam portions 28a and 28b with a phase difference of 180 degrees. The cam gear 28 is rotatably mounted on a supporting shaft 27. The rotational driving power of the DC motor 20 is transmitted to the cam gear 28 via the pinion gear 26. The rotational movement of the cam gear 28 is transformed into reciprocal movements of the upper clipper blade 14 via the upper eccentric cam portion 28a and a connecting member 29a, and is transformed into reciprocal movements of the lower clipper blade 15 via the lower eccentric cam portion 28b and a connecting member 29b. The reverse reciprocal movements of the upper and lower clipper blade 14, 15 enable the cutting of grasses, or the like.

Electrical power is supplied to the DC motor 28 through the power source switch 30 which is a small-sized microswitch (30 mm length×20 mm width×10 mm height; DC 125 V—0.6 A, or the like) disposed within the grip portion 24 of the rear handle 22 as shown in FIG. 3. The power source switch 30 is turned on and off as follows.

When a safety lever 32, swingably mounted on the upper portion of the grip portion 24, is pressed downwardly, an L-shaped control portion 32a of the safety lever 32 moves away from the operation terminal 30a as shown by the dashed line in FIG. 3. At the same time, when a starting lever 34, swingably mounted on a lower portion of the grip portion 24 of the rear handle 22, is pushed up, the operation terminal 30a is pushed into the power source switch 30. Thus, the power source switch 30 is turned on.

When the starting lever 34 is released, the safety lever 32 and the L-shaped control portion 32a thereof will return to the original position, shown by a solid-line in FIG. 3, via a U-shaped spring 36 integral with the starting lever 34 and the safety lever 32. Thus, the operation terminal 30a of the power source switch 30 is returned to the original position by a built-in spring (not shown). Thus, the power source switch 30 is turned off.

Figure 4:
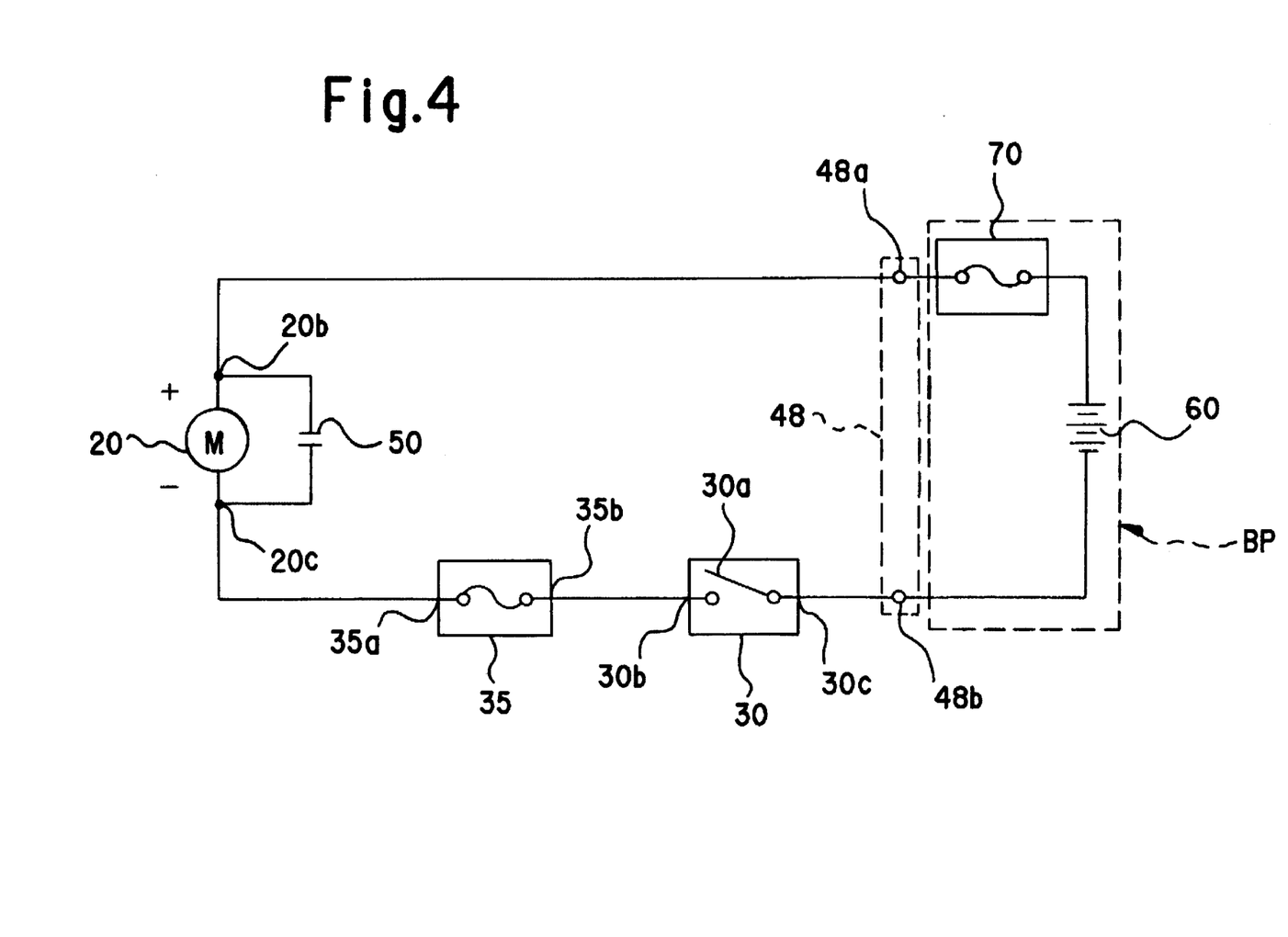
FIG. 4 is an equivalent circuit diagram of a power source supply system shown in FIG. 1.

An equivalent circuit diagram of the power supply system of the portable electric working machine including the DC motor 20 and the power source switch 30 is shown in FIG. 4. In detail, an electric power source 60 comprising a direct current or DC, 12 volt (V)—17 (A) rechargeable battery is connected to a pair of terminals of the power source connector 48 fixed to the motor case portion 12, in other words, connected to both terminals 20b, 20c of the DC motor 20, via the power source switch 30 which is a small-sized microswitch as mentioned above, a manual restoration type circuit protector 35 (20A), and a fuse 70 (30A×2) built in a shoulder-type battery pack BP.

Further detailed description based on FIG. 5 (a power source 60 in the battery back BP and fuse 70 are not shown) is presented as follows. One of the terminals 20b of the DC motor 20 is connected to one of the terminals 48a of the power source connector 48 fixed on a rear and under portion of the motor case portion via wires with connectors 41, 49 (hereinafter referred to as 'wire'). The other terminal 20c of the DC motor 20 is connected to one of terminals 35a of the circuit protector 35 disposed in the leading edge portion of the grip portion 24 via wires 42, 44. The other terminal 35b of the circuit protector 35 is connected to one of the terminals 30b of the power source switch 30 disposed near the starting lever 34 of the grip portion 24 via a wire 46. The other terminal 30c of the power switch 30 is connected to the other terminal 48b of the power source connector 48 via a wire 47. The wires 44 and 47 are tied with a harness cover 45 and are equipped with a cable grommet 53 (see FIGS. 1 and 3) so that the wires can be pulled out through the motor case portion 12 and the grip portion 24.

In this embodiment, as shown in FIG. 2, a spark preventing capacitor 50 having a capacitance of 1,000 µF is disposed within the motor case portion 12. The spark preventing capacitor 50 is laid down to be elastically clamped by curved edge portions of clampers 56, 57 which are downwardly protruded from the upper portion of the motor case portion 12. The minimum length of wires 51, 52 protruding from both terminals of the capacitor 50 are connected together with the wires 41, 42 to a pair of terminals 20b, 20c of the DC motor 20, respectively.

In the portable electric working machine as mentioned above, the spark-preventing capacitor 50 connected between a pair of terminals 20b, 20c of the DC motor 20 absorbs a rapid pulse-shaped voltage fluctuation and therefore prevents sparking between contacts of the power source switch 30 when the power source switch 30 is turned off. Thus, a locking (e.g., seizing, burning, or the like) of the contacts due to contact transition is effectively prevented even if a small-sized microswitch, which has only minimum capacity for steady normal operating electric currency, is employed as a power source switch.

The spark-preventing capacitor 50 is disposed within a relatively large space in the motor case 12 and a small-sized microswitch is employed as a power source switch. Therefore, enlarging the grip portion 24 of the handle 22 is not required so that operativity and manipulability is not diminished.

Figure 7:
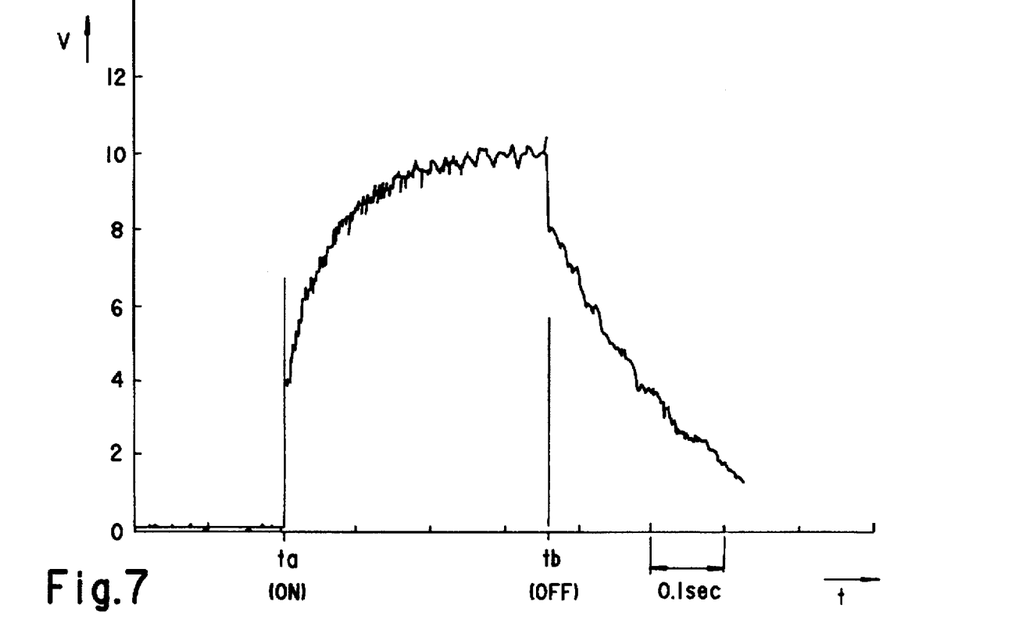
FIG. 7 is a graph showing an examination result for confirming the effectiveness of the embodiments shown in FIGS. 1–5.

FIG. 8 is a graph showing an examination result of a power supply system of a conventional portable electric working machine. FIG. 7 shows a graph showing an examination result of a power supply system of this first embodiment of the present invention.

As shown in FIG. 7, in this first embodiment, when the power source switch 30 is turn on at the time ta and then turned off at the voltage stable time tb, a rapid pulse-shaped voltage fluctuation, which is found in a conventional system, does not occur and therefore sparking between contacts of the power source switch 30 is not generated. Thus, a locking (e.g., seizing, burning, or the like) of the contacts due to contact transition does not occur.

The present invention can be applied to not only above-mentioned clipper trimmer 10, but also the other types of portable electric working machines.

Figure 6:
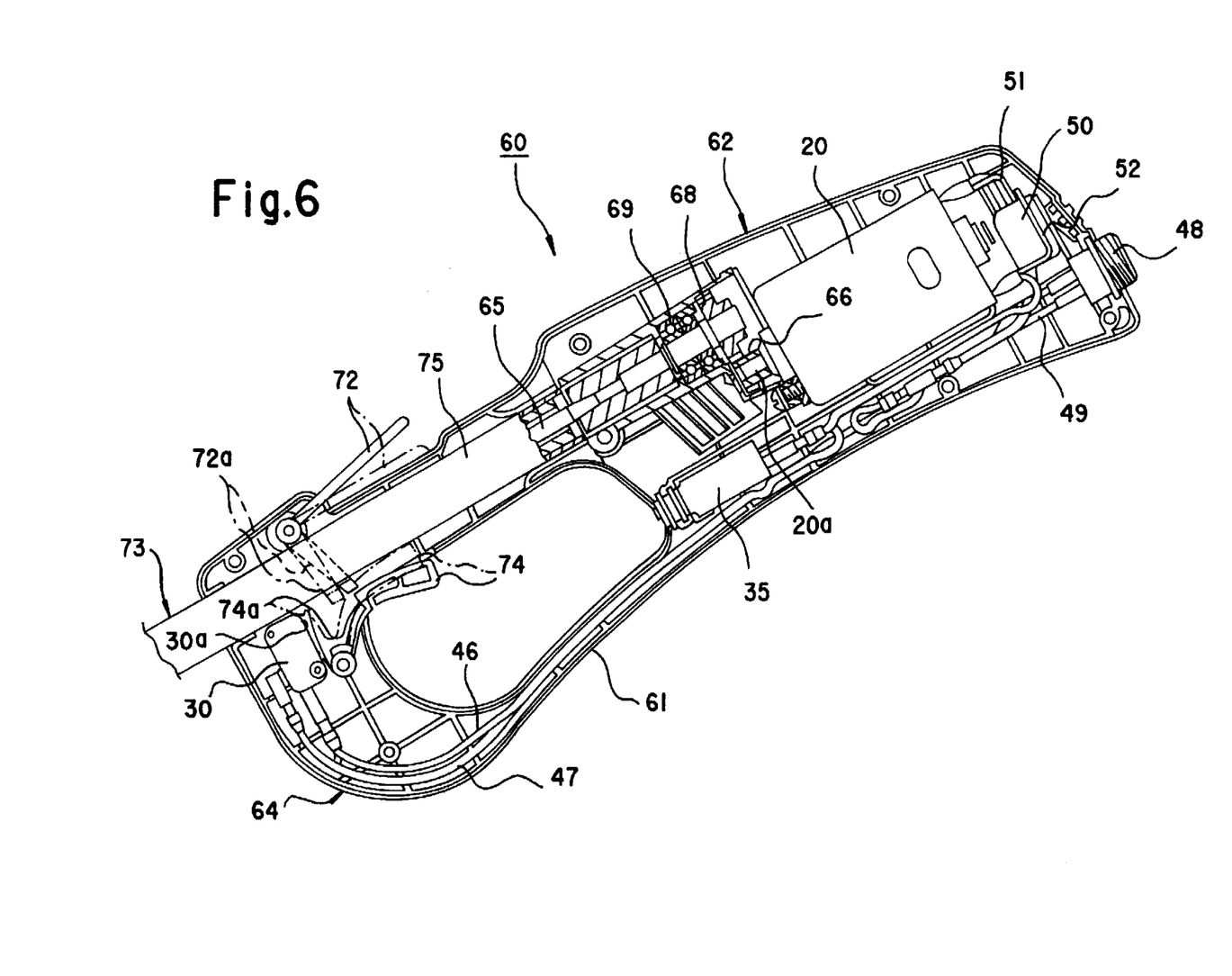
FIG. 6 is a partial cross-sectional view of another embodiment of a portable electric working machine according to the present invention, which is one of the rotary-type trimmers.

FIG. 6 shows a fragmental cross-sectional view showing another embodiment of a rotary cutter-type trimmer as a portable electric working machine according to the present invention. In this trimmer 60, a motor case portion 62 containing a DC motor 20 and a grip portion 64 of a rear handle 61 are integrally connected.

A leading edge portion, of an output shaft 20a protruded from the DC motor 20, is provided with a pinion gear 66. The pinion gear 66 is engaged with a driven gear 68 mounted on a rear portion of a driving shaft 65. The driving shaft 65 is rotatably supported by bearings 69, or the like and inserted in the control shaft 75. The rotational driving power of the DC motor 20 is transmitted to a working portion 73 which includes a rotary cutter blade, or the like, disposed on a leading edge portion of the control shaft 75 via the driving shaft 65.

Electrical power is supplied to the DC motor 20 through a power source switch 30 which is a small-sized microswitch (30 mm length×20 mm width×10 mm height) disposed within the grip portion 64 of the rear handle 61. Like the above-mentioned first embodiment, the power source switch 30 is turned on and off as follows.

When a safety lever 72, swingably mounted on the upper portion of the grip portion 64, is pressed downwardly, a L-shaped control portion 72a of the safety lever 72 moves away from the position in which a movement of the starting lever 74 is regulated. At the same time, when the starting lever 74, which is swingably mounted on a lower portion of the grip portion 64 of the rear handle 61, is pushed up, the operation terminal 30a is pushed into the power source switch 30 as shown by the dashed lines in FIG. 6. Thus, the power source switch 30 is turned on.

When the starting lever 74 is released, the safety lever 72 and the L-shaped control portion 72a thereof will return to the original position via a spring (not shown) and the operation terminal 30a of the power source switch 30 is returned to the original position by a built-in spring (not shown) and the power source switch 30 is turned off.

Figure 5:
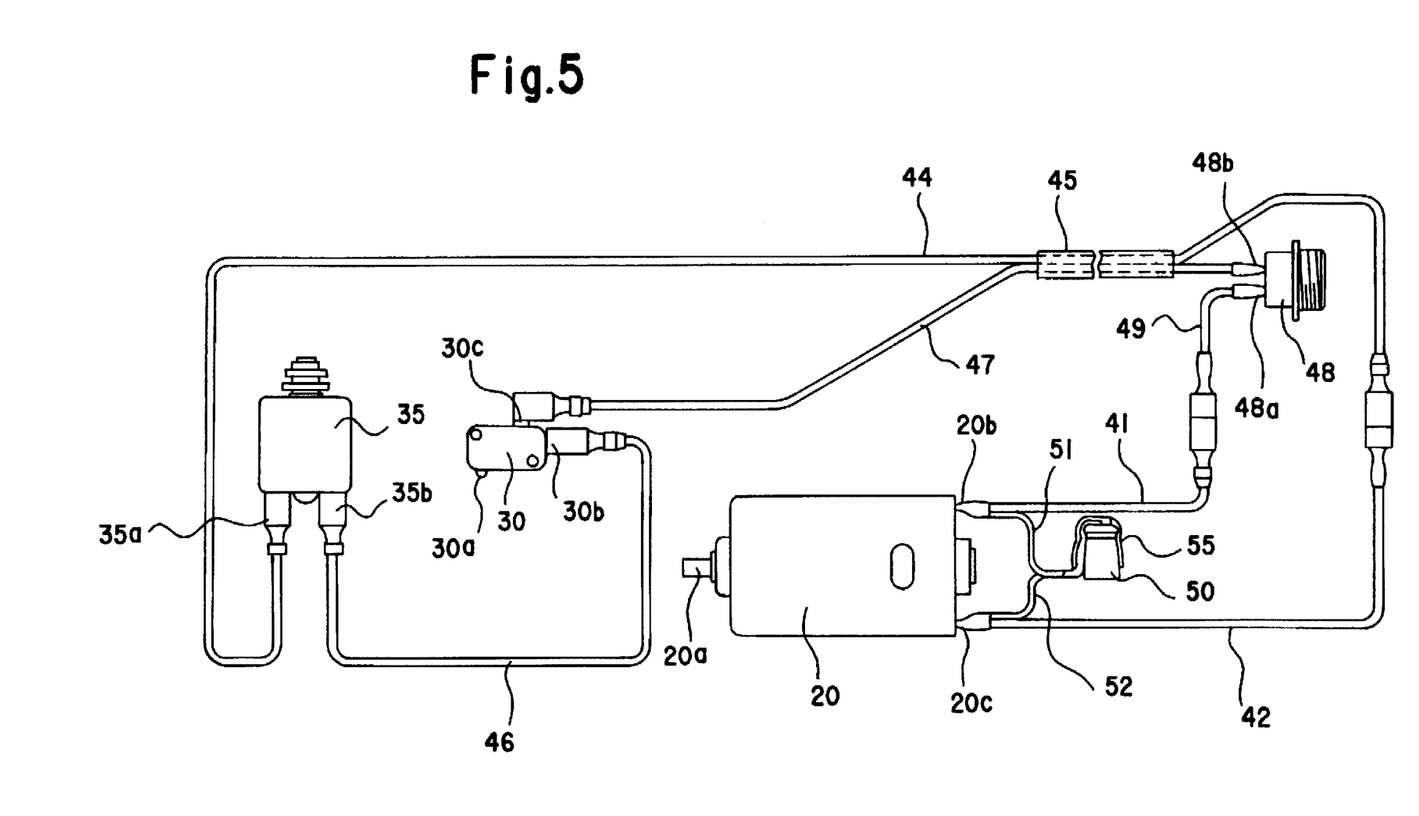
FIG. 5 is a circuit showing a power source supply system shown in FIG. 1.

The power supply system of the above-mentioned embodiment of a portable electric working machine as a rotary cutter-type trimmer 60 including a DC motor 20 and a power source switch 30 is different in the arrangement of parts, but similar in circuit diagram compared to the first embodiment shown in FIGS. 4–5. In the portable electric working machine of this embodiment, the spark-preventing capacitor 50 connected between a pair of terminals of the DC motor 20 absorbs effectively a rapid pulse-shaped voltage fluctuation and therefore prevents sparking between contacts of the power source switch 30 when the power source switch 30 is turned off. Thus, a locking (e.g., seizing, burning, or the like) of the contacts due to contact transition is effectively prevented even if a small-sized microswitch, which has only minimum capacity for steady normal operating electric current, is employed as a power source switch.

The spark-preventing capacitor 50 is disposed within a relatively large space in the motor case 62 and a small-sized microswitch is employed as a power source switch. Therefore, enlarging the grip portion 64 of the handle 61 is not required and operativity and manipulability is not diminished.

As will be understood, in a portable electric working machine according to the present invention, because a spark-preventing capacitor is directly interposed between a pair of terminals of the DC motor, the capacitor effectively absorbs a rapid pulse-shaped voltage fluctuation and therefore prevents sparking when the power source switch is turned off. Thus, a locking (e.g., seizing, burning, or the like) of the contacts of a power source switch due to contact transition is effectively prevented even if a small-sized microswitch is employed as a power source switch.

Further, because the spark-preventing capacitor is disposed within a relatively large space in the motor case and a small-sized microswitch can be employed as a power source switch, enlarging the grip portion of the handle is not required and operativity and manipulability is not diminished.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A portable electric working machine, comprising:
   an electric motor having a pair of terminals;
   a working portion driven by said electric motor;
   a power source switch for supplying electric power to said electric motor therethrough via said pair of terminals; and
   a capacitor interposed between said pair of terminals of said electric motor to prevent sparking at the power source switch when electric power to said electric motor is turned off.

2. A portable electric working machine as recited in claim 1, further comprising a motor case portion which houses said electric motor, wherein said capacitor is accommodated within said motor case portion.

3. A portable electric working machine as recited in claim 1, further comprising a handle with a grip portion, wherein said power source switch is accommodated within said grip portion.

4. A portable electric working machine as recited in claim 1, wherein said power source switch is a small-sized microswitch.

5. A portable electric working machine as recited in claim 1, wherein said capacitor has a capacitance of 450 μF or more.

6. A portable electric working machine, comprising:
   an electric motor having a pair of terminals;
   a motor case portion means for housing said electric motor;
   a working portion driven by said electric motor;
   a handle with a grip portion connected to said motor case portion means;
   a power source switch means accommodated within said grip portion for supplying electric power to said electric motor therethrough via said pair of terminals; and a capacitor interposed between said pair of terminals of said electric motor to prevent sparking at the power source switch when electric power to said electric motor is turned off.

7. A portable electric working machine, comprising:

an electric motor having a pair of terminals;

a motor case portion means for housing said electric motor;

a working portion driven by said electric motor;

a handle with a grip portion connected to said motor case portion means;

a power source switch means accommodated within said grip portion for supplying electric power to said electric motor therethrough via said pair of terminals; and a capacitor interposed between said pair of terminals of said electric motor to prevent sparking at the power source switch when electric power to said electric motor is turned off, said capacitor accommodated within said motor case portion means.

* * * * *